United States Patent
Perronnin et al.

(10) Patent No.: US 8,150,858 B2
(45) Date of Patent: Apr. 3, 2012

(54) CONTEXTUAL SIMILARITY MEASURES FOR OBJECTS AND RETRIEVAL, CLASSIFICATION, AND CLUSTERING USING SAME

(75) Inventors: Florent C. Perronnin, Domene (FR); Yan Liu, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 405 days.

(21) Appl. No.: 12/361,157

(22) Filed: Jan. 28, 2009

(65) Prior Publication Data
US 2010/0191743 A1    Jul. 29, 2010

(51) Int. Cl.
G06F 7/00    (2006.01)
G06F 17/30   (2006.01)

(52) U.S. Cl. .................. 707/748; 707/749; 707/758
(58) Field of Classification Search .......... 707/748–749, 707/758
See application file for complete search history.

(56) References Cited

U.S. PATENT DOCUMENTS

| | | | |
|---|---|---|---|
| 4,905,162 A * | 2/1990 | Hartzband et al. | 706/52 |
| 2002/0087538 A1* | 7/2002 | Abdel-Mottaleb et al. | 707/6 |
| 2007/0282785 A1* | 12/2007 | Fayyad et al. | 707/1 |
| 2009/0112865 A1* | 4/2009 | Vee et al. | 707/7 |
| 2010/0280985 A1* | 11/2010 | Duchon et al. | 706/52 |

OTHER PUBLICATIONS

Jegou et al., "A Contextual Dissimilarity Measure for Accurate and Efficient Image Search," CVPR, (2007).
Merriam-Webster Online Dictionary, context, originally accessed on Aug. 27, 2008 (reprinted 4/220/2009) at http://www.merriam-webster.com/dictionary/context.
Lampert, "Partitioning of Image Datasets Using Discriminative Context Information," CVPR (2008).
Dimmick et al., "Structured forms database 2 user's guide," at http://www.nist.gov/srd/WebGuide/SD_6/nistsd6_ug_A.htm, Sep. 16, 1992.
Sahbi et al., "Context-dependent Kernel Design for Object Matching and Recognition," CVPR, (2007).
Soffer et al., "Pictorial Queries by Image Similarity," Proc. of the 13th Intl. Conf. on Pattern recognition, vol. III, pp. 114-119, Austria, Aug. 1996.
Yuan et al., "Context-Aware Clustering," IEEE (2008).
Zhao et al., "Contextual Distance for Data Perception," IEEE, (2007).
Vasconcelos et al., "Learning Mixture Hierarchies," NIPS, (1998).

* cited by examiner

*Primary Examiner* — John E Breene
*Assistant Examiner* — Joshua Bullock
(74) *Attorney, Agent, or Firm* — Fay Sharpe LLP

(57) ABSTRACT

A method of comparing first and second objects in a context comprises: maximizing or minimizing a quantitative comparison of the first object and a mixture of the second object and the context respective to a weighting parameter that controls the mixture; and outputting a comparison value based on the value of the weighting parameter determined by the maximizing or minimizing.

18 Claims, 2 Drawing Sheets

CONTEXTUAL SIMILARITY MEASURES FOR OBJECTS AND RETRIEVAL, CLASSIFICATION, AND CLUSTERING USING SAME

BACKGROUND

The following relates to the information processing arts, information storage and retrieval arts, classification and clustering arts, and related arts.

The comparison of objects, such as vectors, is an important quantitative analysis operation for many applications, including but not limited to: vector analysis; image processing; document processing; data retrieval; clustering operations; classification operations; and so forth. Not surprisingly, there are a wide range of comparison operators available for comparing different objects. In one organizational scheme, comparison operators can be divided into similarity measures and distance or divergence measures. A similarity measure is characterized in that its value increases when comparing more similar objects, and has a largest value for identical or nearly identical objects. On the other hand, a distance or divergence measure is characterized in that its value increases with increasing difference, that is, increasing distance or divergence, between the objects, and has a zero or small value for identical or nearly identical objects.

For generality, the terms "comparison measure" or "comparison" or other similar phraseology is used herein to encompass both similarity measures and distance or divergence measures.

Existing comparison measures readily facilitate relative comparisons, for example determining whether object "A" is more similar to object "B" than to object "C". However, this information does not inform as to whether objects "A" and "B" are actually comparable to each other. The answer to this latter question depends upon the "context" or "environment" or "setting". For example, consider similarity between a dog and a bull and a fish. In the context of animals, a dog and a bull may be deemed to be quite similar—they are both mammals, both air-breathing, both have four legs, both are typically domesticated, and so forth, whereas the fish is more dissimilar in all these aspects and numerous others, and other animals such as an amoeba are still more dissimilar. However, in the context of four-legged domesticated mammals, the dog and the bull are rather dissimilar—the dog is carnivorous, likely to be a pet, has clawed feet, and so forth, whereas the bull is herbivorous, a farm animal, has hoofed feet, and so forth. In this context, a bull might be deemed to be dissimilar to dog, whereas an animal such as a cat might be deemed to be similar to a dog in the context of four-legged domesticated animals.

BRIEF DESCRIPTION

In some illustrative embodiments disclosed as illustrative examples herein, a storage medium stores instructions executable to compare first and second objects in a context by: maximizing or minimizing a comparison function respective to a weighting parameter, the comparison function including a quantitative comparison of the first object and a mixture of the second object and the context wherein the mixture is controlled by the weighting parameter; and outputting a comparison value that is equal to or determined based on a value of the weighting parameter obtained by the maximizing or minimizing.

In some illustrative embodiments disclosed as illustrative examples herein, a method of comparing first and second objects in a context is disclosed, the method comprising: maximizing or minimizing a quantitative comparison of the first object and a mixture of the second object and the context respective to a weighting parameter that controls the mixture; and outputting a comparison value based on the value of the weighting parameter determined by the maximizing or minimizing.

In some illustrative embodiments disclosed as illustrative examples herein, a quantitative contextual comparison module is disclosed, which is configured to perform the method set forth in the immediately preceding paragraph.

DETAILED DESCRIPTION

The previously described contextual comparison examples relating to dogs, cats, bulls, fish, and amoebas are readily qualitatively understood. However, qualitative understanding is not useful in quantitative analyses, or in information processing systems such as classifiers, information retrieval systems, clustering engines, or so forth. It is recognized herein that what is needed for such applications is quantitative contextual comparison.

Figure 1:
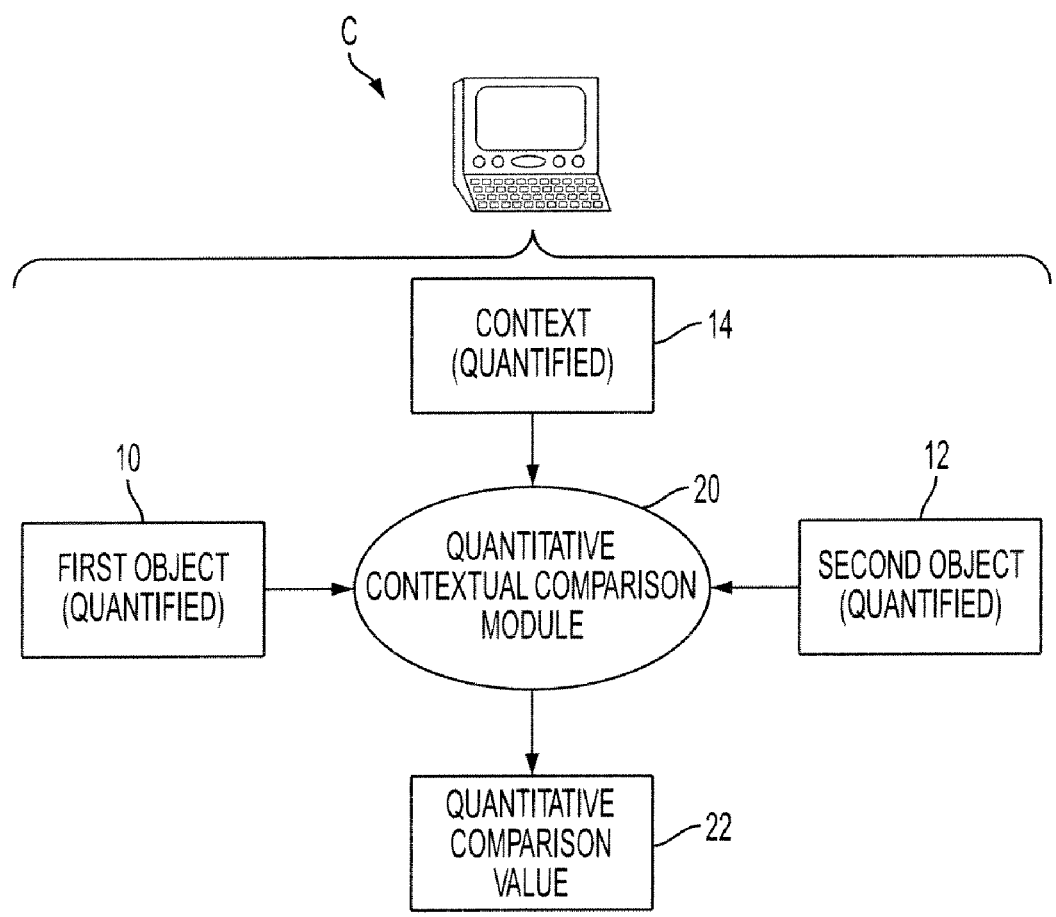
FIG. 1 diagrammatically shows an illustrative quantitative contextual comparison module.

With reference to FIG. 1, a first object 10, a second object 12, and a context 14 are each represented in a quantitative form, such as a discrete or continuous distribution, a vector, a sequence of vectors, or so forth. A quantitative contextual comparison module 20 computes a quantitative comparison value 22 that quantitatively indicates the similarity (or difference or divergence) between the first object 10 and the second object 12 relative to the similarity (or difference or divergence) between the first object 10 and the context 14. As shown herein, the seemingly complex operation of the quantitative contextual comparison module 20 can be implemented in a computationally efficient fashion using substantially any existing non-contextual comparison operator. In one example, a quantitative contextual similarity measure can be written as:

$$cs_f(q,p|u) = \arg\max_\omega \{f(q, \omega \cdot p + (1-\omega) \cdot u)\}, 0 \leq \omega \leq 1 \quad (1).$$

In Equation (1), the quantitative representation of the first object 10 is denoted as q, the quantitative representation of the second object 12 is denoted as p, and the quantitative representation of the context 14 is denoted as u. The function $f(a,b)$ is a non-contextual similarity measure. As such, the function $f(a,b)$ has an increasingly larger value as the parameters a and b become increasingly more similar. The function $\arg\max_\omega \{f(\omega)\}$ outputs the value of the parameter $\omega$ which maximizes the value of the argument $f(\omega)$, under the constraint (in Equation (1)) that $0 \leq \omega \leq 1$. It follows that $0 \leq cs_f(q,p|u) \leq 1$ under the constraint $0 \leq \omega \leq 1$ set forth in Equation (1). The function $cs_f(q,p|u)$ is suitably read as "the contextual similarity of object q with respect to object p in the context u."

To understand the operation of the contextual similarity measure set forth in Equation (1), it is useful to consider some limiting cases. If the first object q 10 and the second object p 12 are identical while there is some dissimilarity between the first object q 10 and the context u 14, then $f(q,p)$ generates the largest possible value for the non-contextual similarity measure $f$. In Equation (1), the expression $f(q,p)$ is the argument of the $\arg\max_\omega \{\ldots\}$ function when $\omega = 1$. It follows that for the limiting case in which the first object q 10 and the second object p 12 are identical (that is, q=p) while there is some dissimilarity between the first object q 10 and the context u 14, the contextual similarity $cs_f(q,p|u)=1$. (The converse does not necessarily hold—that is, $cs_f(q,p|u)=1$ does not necessarily imply that q=p.)

At the opposite limiting case, if the first object q 10 and the context u 14 are identical while there is some dissimilarity between the first object q 10 and the second object p 12, then $f(q,u)$ generates the largest possible value for the non-contextual similarity measure $f$. In Equation (1), the expression $f(q,u)$ is the argument of the arg $\max_\omega\{\ldots\}$ function when $\omega=0$. It follows that for the limiting case in which the first object q 10 and the context u 14 are identical while there is some dissimilarity between the first object q 10 and the second object p 12, the contextual similarity $cs_f(q,p|u)=0$.

For intermediate cases, the expression $\omega \cdot p+(1-\omega)\cdot u$ defines a mixture of the second object p 12 and the context u 14, with the parameter $\omega$ serving as a weighting parameter that controls the mixture. For smaller values of $\omega$ the context u 14 dominates the mixture, whereas for larger values of $\omega$ the second object p 12 dominates the mixture. The arg $\max_\omega \{\ldots\}$ function outputs the value of the weighting parameter $\omega$ for which the mixture of the second object p 12 and the context u 14 is most similar to the first object q 10, as measured by the non-contextual similarity measure $f$. The value of Equation (1) for p=u is ambiguous since in that case the value of $cs_f$ does not depend upon $\omega$—in some embodiments $cs_f(q,p|u)=0.5$ is assigned for p=u.

In Equation (1), the function $f$ is a similarity measure, and is paired with arg $\max_\omega\{\ldots\}$ in order to determine the mixture of the second object p 12 and the context u 14 that maximizes the similarity function. Alternatively, the function $f$ could be a difference or divergence measure, for which a smaller value indicates a higher degree of similarity. In such cases, the arg $\max_\omega\{\ldots\}$ function of Equation (1) is suitably replaced by an arg $\min_\omega\{\ldots\}$ function in order to determine the mixture of the second object p 12 and the context u 14 that minimizes the difference or divergence measure. Although in such cases the non-contextual comparison measure $f$ is a difference or divergence measure, the output of the arg $\min_\omega\{\ldots\}$ function (which is the value output by the contextual similarity measure $cs_f$ assuming the bounding conditions $0 \leq \omega \leq 1$ are not encountered) is still a similarity value in which a larger value is indicative of greater similarity.

Alternatively, the quantitative contextual comparison module 20 can implement a difference or divergence measure, in which the output is larger to indicate greater dissimilarity of p and q in the context u. One way of formulating a contextual difference measure is as follows:

$$cd_f(q,p|u)=1-cs_f(q,p|u) \qquad (2),$$

where $0 \leq cd_f(q,p|u) \leq 1$ when $0 \leq cs_f(q,p|u) \leq 1$. Here, strong similarity (that is, a small distance or divergence) between the first object q 10 and the second object p 12 relative to the context u 14 is indicated by $cd_f(q,p|u) \approx 0$, while a very large distance between the first object q 10 and the second object p 12 relative to the context u 14 is indicated by a larger value for the contextual distance $cd_f(q,p|u)$.

Equations (1) and (2) represent two examples of quantitative contextual comparison operators. More generally, a quantitative contextual comparison operator can be implemented by maximizing or minimizing a comparison function respective to a weighting parameter and generating an output based on the value of the weighting parameter determined by the maximizing or minimizing, where the comparison function includes a quantitative comparison of the first object 10 and a mixture of the second object 12 and the context 14 and where the mixture is controlled by the weighting parameter. For linear mixtures, a suitable comparison function can be written as $f(q,\omega \cdot p+(1-\omega)\cdot u)$ or as $f(q,(1-\omega)\cdot p+\omega \cdot u)$, and is maximized or minimized respective to the weighting parameter represented as $\omega$, where the first object is represented as q, the second object is represented as p, the context is represented as u, and the $f$ is a similarity, difference, or divergence measure. Optionally, the minimizing or maximizing is performed under a constraint on the allowable range of values that the weighting parameter may assume, such as the constraint $0 \leq \omega \leq 1$ that is included in illustrative Equation (1). Optionally, the comparison function can be symmetrized. For example, the contextual similarity measure of Equation (1), can be symmetrized as:

$$scs_f(q,p) = \qquad (3)$$
$$\operatorname{argmax}_\omega \{f(q, \omega \cdot p + (1-\omega)\cdot u) + f(p, \omega \cdot q + (1-\omega)\cdot u)\},$$
$$0 \leq \omega \leq 1.$$

Another way of symmetrizing the contextual similarity measure of Equation (1) is to sum $cs_f(q,p|u)+cs_f(p,q|u)$. In these examples, the comparison function is symmetrized by further including a quantitative comparison of the second object 12 and a second mixture, where the second mixture is of the first object 10 and the context 14 and is also controlled by the weighting parameter.

The disclosed quantitative contextual comparison measures can be viewed as contextualized versions of non-contextual similarity measures. Most known non-contextual comparison measures can serve as the comparison function that is maximized or minimized with respect to a weighting parameter and includes a quantitative comparison of the first object and a mixture of the second object and the context wherein the mixture is controlled by the weighting parameter. Accordingly, most non-contextual comparison measures can be contextualized as disclosed herein. To further demonstrate this point, some further illustrative examples follow.

In one embodiment, the non-contextual comparison measure is a Euclidean distance $$L2(x,y) = \sum_{i=1}^{D}(x_i - y_i)^2,$$

where $x_i$ and $y_i$ denote respectively the i-th dimensions of vectors x and y and D is the dimensionality of the vectors. In such as case, Equation (1) can be written as:

$$cs_{L2}(q,p|u) = \operatorname{argmin}_\omega \left\{ \sum_{i=1}^{D}[q_i - (\omega \cdot p_i + (1-\omega)\cdot u_i)]^2 \right\}, \qquad (4)$$
$$0 \leq \omega \leq 1.$$

Because a distance measure is used in Equation (4), the arg $\max_\omega\{\ldots\}$ of Equation (1) is replaced by arg $\min_\omega\{\ldots\}$ in Equation (4). The contextual comparison measure $cs_{L2}$ is still a similarity measure, even though the constituent non-contextual comparison measure is a distance measure. In other words, larger values for $cs_{L2}$ still indicate greater similarity. For quantities p,q,u that are multinomials of dimensionality D, Equation (4) can be solved in closed form by setting the derivative of the concave Euclidean distance $$\sum_{i=1}^{D} [q_i - (\omega \cdot p_i + (1 - \omega) \cdot u_i)]^2 \quad (5)$$

to zero, yielding:

$$cs_{L2}(q, p \mid u) = \frac{\sum_{i=1}^{D} (p_i - u_i)(q_i - u_i)}{\sum_{i=1}^{D} (p_i - u_i)^2},$$

$$0 \leq \omega \leq 1.$$

When applying Equation (5), the constraint $0 \leq \omega \leq 1$ is enforced as follows. If the computed value of $\omega$ is less than zero, then $cs_{L2}=0$ is assigned. If the computed value of $\omega$ is greater than one, then $cs_{L2}=1$ is assigned. This contextual quantitative similarity measure formulation has a simple geometric interpretation: $cs_{L2}$ is proportional to the projection of the vector (q−u) onto the vector (p−u).

In another embodiment, the non-contextual comparison measure is a Manhattan distance L1, for which Equation (1) can be written as (in the case of quantities p,q,u that are multinomials of dimensionality D):

$$cs_{L1}(q, p \mid u) = \operatorname{argmin}_\omega \left\{ \sum_{i=1}^{D} |q_i - (\omega \cdot p_i + (1 - \omega) \cdot u_i)| \right\}, \quad (6)$$

$$0 \leq \omega \leq 1.$$

The function $cs_{L1}$ is convex and piecewise linear. Thus, its minimum is reached at one of the values $(q_i-u_i)/(p_i-u_i)$. The minimization of $$\sum_{i=1}^{D} |q_i - (\omega \cdot p_i + (1 - \omega) \cdot u_i)|$$

respective to $\omega$ can be performed as a weighted median problem which can be solved in O(D).

In another embodiment, the non-contextual comparison measure is a Kullback-Leibler (KL) divergence, for which Equation (1) can be written as (in the case of quantities p,q,u that are multinomials of dimensionality D):

$$cs_{KL}(q, p \mid u) = \operatorname{argmin}_\omega \left\{ \sum_{i=1}^{D} q_i \log\left(\frac{q_i}{\omega \cdot p_i + (1 - \omega) \cdot u_i}\right) \right\}, \quad (7)$$

$$0 \leq \omega \leq 1.$$

This objective function is similar to that of Probabilistic Latent Semantic Analysis (PLSA). See, for example, Hofmann, "Unsupervised learning by probabilistic latent semantic analysis", Machine Learning vol. 42 pp. 177-96 (2001) which is incorporated herein by reference in its entirety. By analogy to PLSA, Equation (7) can be optimized iteratively using the expectation maximization (EM) algorithm. At iteration (k+1) the expectation (E) step yields:

$$\gamma_i^{(k+1)} = \frac{\omega^{(k)} p_i}{\omega^{(k)} p_i + (1 - \omega^{(k)}) \cdot u_i}, \quad (8)$$

and the maximization (M) step yields:

$$\omega^{(k+1)} = \sum_{i=1}^{D} q_i \gamma_i^{(k+1)}. \quad (9)$$

However, the EM algorithm can be slow to converge. Accordingly, an alternative, faster optimization technique can optionally be employed to solve the $\arg\min_\omega \{\ldots\}$ minimization of Equation (7), such as gradient-descent type algorithms.

In another embodiment, the non-contextual comparison measure is a Bhattacharyya similarity measure, for which Equation (1) can be written as (in the case of quantities p,q,u that are multinomials of dimensionality D):

$$cs_{bha}(q, p \mid u) = \operatorname{argmax}_\omega \left\{ \sum_{i=1}^{D} q_i \cdot (\omega \cdot p_i + (1 - \omega) \cdot u_i) \right\}, \quad (10)$$

$$0 \leq \omega \leq 1.$$

In Equation (10), the $\arg\max_\omega \{\ldots\}$ function is used because the non-contextual comparison measure is a similarity measure. The objective function that is maximized respective to $\omega$ by the $\arg\max_\omega \{\ldots\}$ function in Equation (10) is advantageously concave, and can be optimized using gradient-based methods or other iterative optimization methods.

These are merely illustrative examples, and other non-contextual comparison measures can be used for the function $f$, such as a Hellinger (HE) distance defined by $$\sum_{i=1}^{D} \left(\sqrt{p_i} - \sqrt{q_i}\right)^2$$

or a chi-squared distance, both of which advantageously lead to convex objective functions when used in Equation (1) together with $\arg\min_\omega \{\ldots\}$. The contextual similarity measure obtained by using the HE or chi-squared distance together $\arg\min_\omega \{\ldots\}$ is suitably solved using iterative gradient-based methods.

Two classes of non-contextual comparison measures that can be used in Equation (1) include the class of Bregman divergences and the class of Csizár divergences, both of which are advantageously typically convex in $\omega$ when used in Equation (1). The Bregman divergence between two distributions x and y both of which are belonging to the space of probabilities $\Omega$ for a convex function $h:\Omega \rightarrow \Re$ is defined as:

$B_h(x,y) = h(x) - h(y) - \langle \nabla h(y), (x-y) \rangle$ where $\nabla h$ denotes the gradient vector of h and $\langle \ldots \rangle$ denotes a dot product. Intuitively, $B_h(x,y)$ can be understood as the difference between the value of h at point x and the value of the first-order Taylor expansion of h around v evaluated at x. Members of the class of Bregman divergences include the Euclidean distance (discussed with reference to Equations (4) and (5)), the Mahalanobis distance, the KL divergence (discussed with reference to Equations (7)-(9)) and the Itakura-Saito divergence.

The Csizár divergence between two discrete distributions x and y for a convex function $h: \mathfrak{R} \rightarrow \mathfrak{R}$ is given by:

$$f_h(x, y) = \sum_i x_i \times h\left(\frac{y_i}{x_i}\right). \tag{11}$$

Members of the class of Csizár divergences include the Manhattan distance (discussed with reference to Equation (6)), the KL divergence (discussed with reference to Equations (7)-(9)), the Hellinger (HE) divergence, and the Rényi divergence.

As used herein, the terms "minimizing", "maximizing", and the like are to be understood as calling for finding a value of the function or expression that is at least sufficiently small or sufficiently large for an intended purpose or for an intended analysis. In some embodiments, "minimizing" or "maximizing" may be performed by identifying the global minimum or global maximum, for example as results by evaluating a closed-form expression for the minimum or maximum.

In some embodiments, "minimizing" or "maximizing" may be performed by an iterative process that is terminated when a stopping criterion is met, such as a change in the value of the function from one iteration to the next falling below a threshold, or a change in the value of the parameter that is adjusted during optimization (that is, the weighting parameter $\omega$ in the case of maximizing the argument of $\arg\max_\omega\{\ldots\}$ in Equation (1)), or so forth. In such embodiments, the obtained minimum or maximum may be slightly higher than or lower than the global minimum or maximum, respectively.

In yet other embodiments, minimizing or maximizing may be used for the intended purpose or intended analysis of determining whether the similarity (or difference) is greater than (or less than) a threshold value. Taking the use of similarity for retrieval as an illustrative example, it may be desired to determine where the first and second objects 10, 12 in the context 14 are more similar than a threshold similarity value. The first object 10 is retrieved if the first and second objects 10, 12 in the context 14 are more similar than the threshold similarity value, and is not retrieved otherwise.

In some such "thresholding" embodiments, evaluation of the $\arg\max_\omega\{\ldots\}$ or $\arg\min_\omega\{\ldots\}$ function may be expedited based on the knowledge that the output generated based on the maximizing or minimizing is the binary decision of whether the threshold criterion is met. For example, if the argument of $\arg\max_\omega\{\ldots\}$ or $\arg\min_\omega\{\ldots\}$ is differentiable at the threshold which is denoted herein as $\theta$, and if the argument of $\arg\max_\omega\{\ldots\}$ or $\arg\min_\omega\{\ldots\}$ is concave in $\omega$ (for $\arg\max_\omega\{\ldots\}$) or convex in $\omega$ (for $\arg\min_\omega\{\ldots\}$), then there exists the equivalence (for the $\arg\max_\omega\{\ldots\}$ embodiment as in Equation (1); the $\arg\min_\omega\{\ldots\}$ analysis is analogous):

$$\arg\max_\omega \{f(q, \omega \cdot p + (1-\omega) \cdot u)\} \geq \tag{12}$$
$$\theta \Leftrightarrow \left.\frac{\partial}{\partial \omega}\right|_{\omega=0} f(q, \omega \cdot p + (1-\omega) \cdot u) \geq 0$$

An advantage of the gradient-based expression of the right-hand side of Equation (12) is that can be faster to evaluate for some embodiments as compared with the left-hand side. As an example, applying the equivalence of Equation (12) for the KL divergence of Equation (7) yields:

$$\sum_{i=1}^{D} q_i \frac{p_i - u_i}{\theta \cdot p_i + (1-\theta) u_i} \geq 0. \tag{13}$$

The threshold $\theta$ is known. If the application is to compare numerous different first objects q 10 with a single reference second object p 12 in the context u 14, then the fraction terms of Equation (12) involving only p, u, and $\theta$ can be pre-computed and Equation (13) can be evaluated for each first object q 10 as a dot product.

The relationship set forth in Equation (12) can also be used to expedite computing similarity measures in other ways. For example in some applications it may be desired to determine the similarity value for all first objects whose similarity to a reference second object 12 in the context 14 exceeds the threshold $\theta$. In these applications, a fast binary determination using the right-hand side of Equation (12) can be used to filter the first objects, and then Equation (1) can be used to determine the numerical similarity value for those first objects having similarities exceeding the threshold $\theta$.

The context u 14 can be generated in various ways, depending upon the application and the available a priori knowledge. In some embodiments, the context u 14 represents a "typical" distribution of objects, and $cs_f(q,p|u)$ then provides a quantitative assessment of how similar the first object q 10 is to the second object p 12 in the context u 14 of this "typical" distribution of objects. The context u 14 can, for example, be defined based on a set of N objects $\{o_1, o_2, \ldots o_N\}$ that represent the context. One approach is:

$$u^f = \arg\max_u \left\{\sum_{k=1}^{N} f(o_k, u)\right\}, \tag{14}$$

where $f$ is a non-contextual similarity measure. If a non-contextual difference or divergence measure is used in place of the similarity measure $f$, then the $\arg\max_u\{\ldots\}$ in Equation (14) is suitably replaced by $\arg\min_u\{\ldots\}$. In some applications, it may be useful to generate contextual comparison measures at a number of different scales. One way to do this is to employ Equation (14) for different sub-sets of the N objects $\{o_1, o_2, \ldots o_N\}$ selected based on a criterion such as closeness of the objects of the sub-set to a reference object, as measured (for example) by the non-contextual similarity measure $f$. Equation (14) is merely an example of one way to define the context 14, and numerous other ways can also be used. In some embodiments, for example, the context 14 is suitably defined as a discrete or continuous probability distribution constructed based on a set of objects constructed based on other a priori information. For example, the context of "mammals and birds" can be defined as a set or range of characteristics such as: number of legs (two or four); number of wings (zero or two); and so forth, without reference to any particular mammal or bird.

The quantitative contextual comparison module 20 of FIG. 1, as well as retrieval systems, classification systems, clustering systems, or so forth that utilize the quantitative contextual comparison module 20, can be embodied in various ways. In the illustrated embodiments, a computer C includes a digital processor that is suitably programmed to perform the operations of the quantitative contextual comparison module 20 and of retrieval, classification, or clustering systems employing same. Other suitably programmed digital processors or controllers or devices including same can also be used, such as an Internet-based server system, or a personal data assistant (PDA), or an automated forms receiving system, or so forth. Additionally or alternatively, a storage medium suitably stores instructions executable by such a processor or controller to implement the quantitative contextual comparison module 20, and optionally to further implement a retrieval, classification, clustering, or other system using the quantitative contextual comparison module 20. The storage medium may, for example, comprise a hard disk or other magnetic storage medium that may be a standalone component or an integral part of a computer or other digital processing device, or an optical disk or other optical storage medium that may be a standalone component or an integral part of a computer or other digital processing device, or a FLASH memory or other electrostatic storage medium that may be a standalone component or an integral part of a computer or other digital processing device, or so forth.

Figure 2:
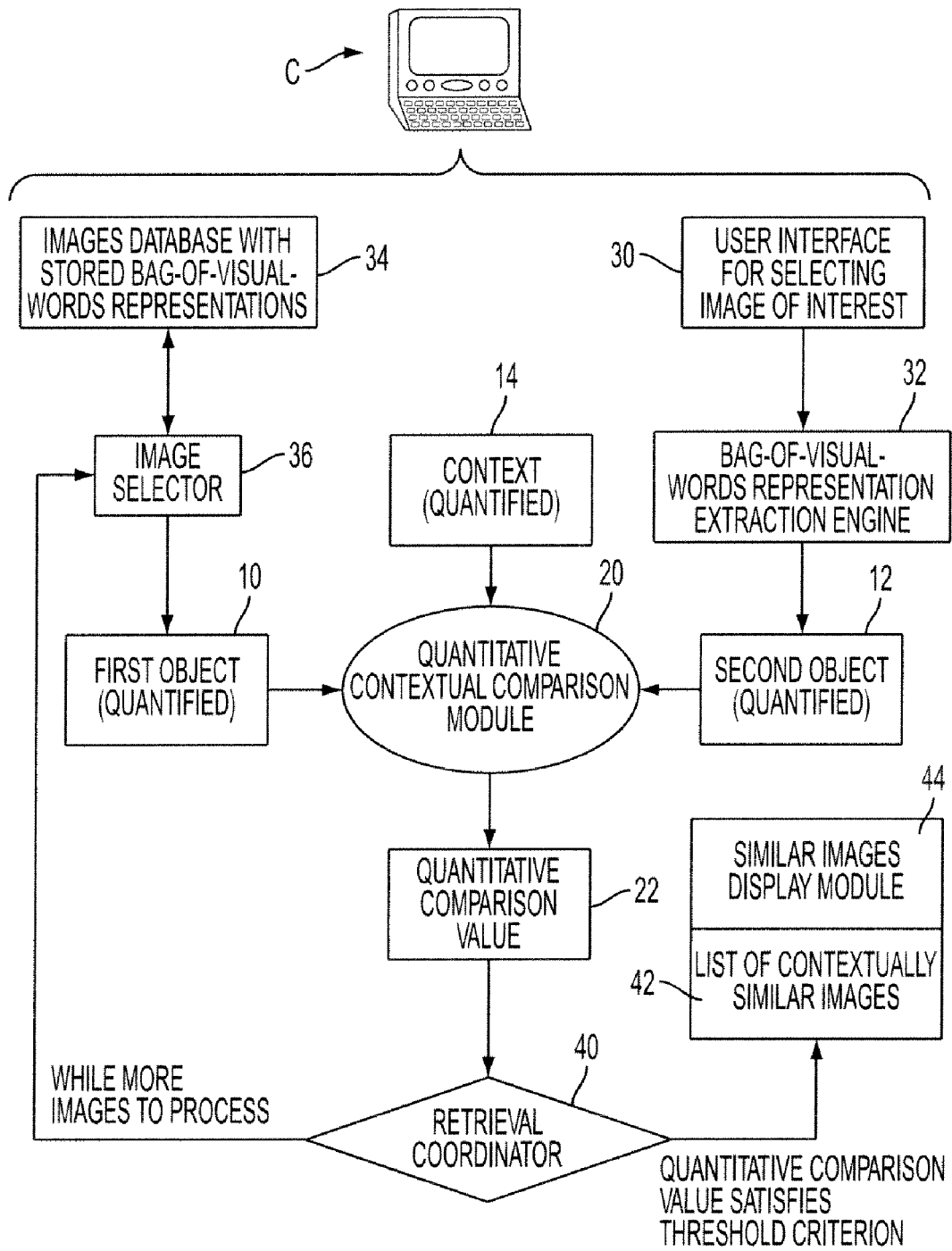
FIG. 2 diagrammatically shows an illustrative image retrieval system employing the quantitative contextual comparison module of FIG. 1.

With reference to FIG. 2, an illustrative image retrieval system is shown which is embodied by the computer C with suitable programming, and which employs the quantitative contextual comparison module 20 of FIG. 1. In this illustrative image retrieval application, a user employs a user interface 30 to identify an image of interest. For example, the image may be obtained from the Internet, or from a local area network, or may be generated by optically scanning a printed image, or so forth. The user interface 30 suitably incorporates the keyboard, mouse, or other user input devices of the computer C. The image is converted to a quantitative representation by a bag-of-visual-words representation extraction engine 327 and the resulting bag-of-visual-words representation of the user-selected image serves as the second object p 12. Quantitative bag-of-visual-words representations for images are known in the art, and are described (for example) in: Sivic et al., "Video google: A text retrieval approach to object matching in videos", In IEEE ICCV (2003); Csurka et al., "Visual categorization with bags of keypoints", in ECCV Workshop on Statistical Learning for Computer Vision (2004); both of which are incorporated herein by reference in their entireties.

The objective is to retrieve images from an archival images database 34 that are contextually similar to the image selected by the user. In the illustrated embodiment, the images of the images database 34 are stored together with corresponding bag-of-visual-words representations. Such an approach advantageously enables the stored images to be efficiently processed in quantitative fashion based on their bag-of-visual-words representations. Accordingly, an image selector 36 selects a first archived image from the archival images database 34 and the stored bag-of-visual-words representation of the selected archival image serves as the first object q 10. If the bag-of-visual-words representations are not stored in the archival images database 34, then the bag-of-visual-words representation extraction engine 32 can be invoked to create the bag-of-visual-words representation for the selected archival image.

The quantitative contextual comparison module 20 operates as described herein to output the quantitative comparison value 22. The context 14 is pre-defined in the embodiment illustrated in FIG. 2. For example, the context 14 may be a context typically employed by the user, such as a context of "animal images" if the user is an animal photographer. Alternatively, a plurality of selectable contexts can be stored in the images database 34 or elsewhere, and the user can select a desired appropriate context for the context 14 using the user interface 30 or another selection tool.

A retrieval coordinator 40 makes decisions regarding the image retrieval process. The coordination includes deciding whether or not to add the image selected by the selector 36 to a list of contextually similar images 42 based on whether the quantitative comparison value 22 satisfies a selection criterion (such as, for example, the threshold θ of previously described examples). The retrieval coordinator 40 also decides whether or not to continue to process more images based on criteria such as whether unprocessed archival images remain in the archival images database 34, whether the list of contextually similar images 42 has exceeded a maximum allowable value, or so forth. In this way, the image retrieval system cycles through the archival images in the database 34 to identify images that are contextually similar to the image selected by the user in view of the pre-selected context 14. After (and optionally during) the image retrieval process, the images contained in or identified by the list of contextually similar images 42 are suitably presented to the user via a display module 44, for example by being shown on a display of the computer C. The display module 44 optionally enables the user to perform operations on the listed images, such as removing images from the list based on the user's discretion, copying or transferring selected images from the list 42 to a desktop publishing application program (not shown) running concurrently on the computer C, or so forth.

The image retrieval application described with reference to FIG. 2 is an illustrative example. Other applications of the quantitative contextual comparison module 20 include, for example: classification, clustering, density estimation, and so forth. Indeed, the disclosed quantitative contextual comparison techniques are generally useful in any application that employs a similarity measure or a distance or divergence measure.

As another illustrative example, kernel classifiers typically score an object x respective to a set of training object examples $\{x_i, i=1, \ldots, N\}$ having labels $\{y_i, i=1, \ldots, N\}$ where $y_i=-1$ indicates the corresponding training object $x_i$ does not belong to the class and $y_i=+1$ indicates the corresponding training object $x_i$ does belong to the class. A typical kernel-based score takes the form $$s(x) = \varphi\left(\sum_{i=1}^{N} \alpha_i y_i k(x, x_i) + b\right)$$

where φ is a non-decreasing function and $\{\alpha_i, i=1, \ldots, N\}$ and b are parameters to be estimated during training. In existing kernel classifiers the function k is typically a non-contextual similarity measure. By using a contextual similarity measure disclosed herein, with a suitable context, for the function k, the kernel classifier accuracy can be improved. The context can be generated, for example, from the training set using the approach of Equation (14) or using another approach.

The disclosed contextual similarity measures can also be used for clustering applications. For example, one illustrative hierarchical contextual clustering (HCC) procedure is as follows. The procedure clusters a set L of distributions. First, the context u is estimated from the set of distributions L, using the approach of Equation (14) or using another approach. Second, the contextual similarity between all pairs of distributions in L in the context u is computed using Equation (1) to form a contextual similarity matrix. Clustering is then performed using substantially any kernel clustering method operating on the contextual similarity matrix to obtain K clusters. Finally, assigning $L_1, L_2, \ldots, L_K$ as the lists of distributions corresponding to the K clusters, the hierarchical contextual clusters are defined as $HCC(L_1), HCC(L_2), \ldots, HCC(L_K)$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A storage medium storing instructions executable to compare first and second objects in a context by:
    maximizing or minimizing a comparison function including at least one of $f(q,\omega \cdot p+(1-\omega)\cdot u)$ and $f(q,(1-\omega)\cdot p+\omega \cdot u)$ respective to a weighting parameter $\omega$ where the first object is represented as q, the second object is represented as p, the context is represented as u, and function $f$ is a similarity, difference, or divergence measure, and
    outputting a comparison value that is equal to or determined based on a value of the weighting parameter $\omega$ obtained by the maximizing or minimizing.

2. The storage medium as set forth in claim 1, wherein the comparison function is a similarity measure, and the instructions are executable to compare the first and second objects in the context by maximizing the similarity measure respective to the weighting parameter.

3. The storage medium as set forth in claim 2, wherein the outputting comprises outputting a contextual similarity measure equal to the value of the weighting parameter that maximizes the similarity measure.

4. The storage medium as set forth in claim 1, wherein the comparison function is a difference or divergence measure.

5. The storage medium as set forth in claim 1, wherein the comparison function is selected from the class of Bregman divergences.

6. The storage medium as set forth in claim 1, wherein the comparison function is selected from the class of Csizár divergences.

7. The storage medium as set forth in claim 1, wherein the maximizing or minimizing of the comparison function respective to a weighting parameter $\omega$ is performed under the constraint that the weighting $\omega$ lies in an interval [0,1].

8. The storage medium as set forth in claim 1, wherein the maximizing or minimizing of the comparison function respective to a weighting parameter is terminated responsive to the weighting parameter satisfying a termination criterion.

9. The storage medium as set forth in claim 1, further storing instructions executable to perform a retrieval method including retrieving the first object conditional upon the outputted comparison value.

10. The storage medium as set forth in claim 1, further storing instructions executable to perform a clustering method including grouping together first and second objects based at least in part on the outputted comparison value.

11. The storage medium as set forth in claim 1, wherein the comparison function is symmetrized by further including a quantitative comparison of the second object p and a mixture of the first object q and the context u wherein the quantitative comparison of the second object p and the mixture of the first object q and the context u is also controlled by the weighting parameter $\omega$.

12. The storage medium as set forth in claim 1, wherein the comparison function comprises a symmetrized similarity measure $scs_f(q,p)=\arg \max_\omega \{f(q,\omega \cdot p+(1-\omega)\cdot u)+f(p,\omega \cdot q+(1-\omega)\cdot u)\}$ where $0 \leq \omega \leq 1$.

13. A storage medium storing instructions executable to compare first and second objects in a context by:
    maximizing or minimizing a comparison function respective to a weighting parameter, the comparison function including a quantitative comparison of the first object and a mixture of the second object and the context wherein the mixture is controlled by the weighting parameter, wherein the maximizing or minimizing comprises maximizing or minimizing $f(q,\omega \cdot p+(1-\omega)\cdot u)$ or $f(q,(1-\omega)\cdot p+\omega \cdot u)$ respective to the weighting parameter represented as $\omega$, where the first object is represented as q, the second object is represented as p, the context is represented as u, and $f$ is a similarity, difference, or divergence measure; and
    outputting a comparison value that is equal to or determined based on a value of the weighting parameter obtained by the maximizing or minimizing.

14. The storage medium as set forth in claim 13, wherein the maximizing or minimizing is performed under the constraint $0 \leq \omega \leq 1$.

15. A method comprising:
    comparing first and second objects in a context by maximizing or minimizing a comparison function including at least one of $f(q,\omega \cdot p+(1-\omega)\cdot u)$ and $f(q,(1-\omega)\cdot p+\omega \cdot u)$ respective to a weighting parameter $\omega$ where the first object is represented as q, the second object is represented as p, the context is represented as u, and function $f$ is a similarity, difference, or divergence measure; and
    outputting a comparison value that is equal to or determined based on a value of the weighting parameter $\omega$ obtained by the maximizing or minimizing;
    wherein the comparing and outputting operations are performed by a digital processor.

16. The method as set forth in claim 15, further comprising:
    retrieving the first object q conditional upon the outputted comparison value satisfying a threshold.

17. The method as set forth in claim 15, wherein the outputting comprises:
    outputting a binary decision value indicative of whether the value of the weighting parameter $\omega$ determined by the maximizing or minimizing satisfies a threshold.

18. A digital processor configured to perform the method of claim 15.

* * * * *